United States Patent [19]
Zimmern

[11] 3,788,784
[45] Jan. 29, 1974

[54] GLOBOID WORM FLUID-FLOW MACHINES

[76] Inventor: Bernard Zimmern, 27, Rue Delabardere, Neuilly-sur-Seine, France

[22] Filed: July 3, 1972

[21] Appl. No.: 268,890

[30] Foreign Application Priority Data
July 30, 1971  France .............................. 71.27968

[52] U.S. Cl. .................... 418/153, 74/425, 74/458, 418/195
[51] Int. Cl. ............................ F01c 5/02, F16h 1/16
[58] Field of Search .......... 418/152, 153, 178, 195; 74/425, 458, DIG. 10

[56] References Cited
UNITED STATES PATENTS

| | | | |
|---|---|---|---|
| 1,785,140 | 12/1930 | Morris | 418/195 |
| 2,716,861 | 9/1955 | Goodyear | 418/195 X |
| 3,133,695 | 5/1964 | Zimmern | 418/195 X |
| 3,551,082 | 12/1970 | Zimmern | 418/195 |

*Primary Examiner*—C. J. Husar
*Assistant Examiner*—Leonard Smith
*Attorney, Agent, or Firm*—Young and Thompson

[57] ABSTRACT

The invention relates to machines such as compressors or pumps of the kind including an hourglass worm meshing with a toothed pinion. It is known to make the pinion of metal coated with a resilient material such as plastic rigidity fixed to the surface of the metallic pinion. According to the invention the metal pinion is covered with a plastic lining having teeth which engage the threads of the worm and prevent the metal teeth of the pinion from engaging those threads. The plastic lining is permitted a slight shifting about its average position respectively to the metal pinion.

7 Claims, 10 Drawing Figures

GLOBOID WORM FLUID-FLOW MACHINES

This invention relates to globoid worm (or hourglass worm) fluid-flow machines, such as compressors, pumps, or expansion units.

It is known that such machines, as for instance described in French Pat. No. 1,331,998 and U.S. Pat. No. 3,551,082, have a rotor consisting of a globoid worm with several threads co-operating with at least one gate-rotor consisting of a metal pinion whose teeth are engaging the threads of the rotor in order to achieve compression or expansion of the enclosed gaseous medium.

Also, it is known after U.S. Pat. No. 2,716,861, that the above-mentioned pinions can be completely coated with some flexible and relatively resilient material, such as synthetic rubber or plastic, such coating being rigidly attached all over the surface of the pinions.

However, experience tends to show two kinds of drawbacks in such systems.

First, rapid erosion will develop on the sides of the pinion teeth, in some cases, where they come against the threads of the rotor. This is rather unexpected, since said pinions are not subjected to any braking reaction, and remain perfectly free to move between the threads of the rotor. Such erosion is observed particularly in compressors, even with oil lubrication. It is still worse if water lubrication is attempted, which indeed is specially interesting for oil-free production of compressed air.

Second, such known arrangements are relatively noisy. For instance, a compressor or vacuum pump having a swept volume of 4,000 liters per minute will produce a noise level of some 85 to 90 decibels at a distance of 1 meter.

The object of the invention is to overcome such difficulties, and more precisely to provide machines having a seriously extended operating life, practically suppressing all erosion effects, even with water lubrication, and seriously reducing the noise level, by some 10 to 15 decibels in the aforementioned case.

In accordance with the invention, there is provided a globoid worm fluid-flow machine, such as a compressor, a pump or expansion unit, comprising a rotor with several threads, at least one toothed metal pinion whose teeth are co-operating with said threads, a casing at least partly covering said rotor and where passageways have been cut for the path of said teeth, inlet and outlet apertures for the fluid on each side of said rotor, high pressure apertures being located near said pinions, wherein the width of the teeth of the metal pinion is smaller than the distance between two contiguous threads of the rotor, at least a part of that face of the pinion which is subjected to the fluid pressure being covered with a plastic material lining, the parts of this lining covering the teeth of the pinion being wider than the latter teeth, in order to have said parts in touch with the threads of the rotor, avoiding contacts of the teeth of the metal pinion against said threads, means being provided for a slight shifting of the lining around its average position on the pinion.

Further features and advantages of the invention will become apparent from the following description of several embodiments taken as non-limitative examples, and illustrated in the appended drawings, in which.

Figure 1:
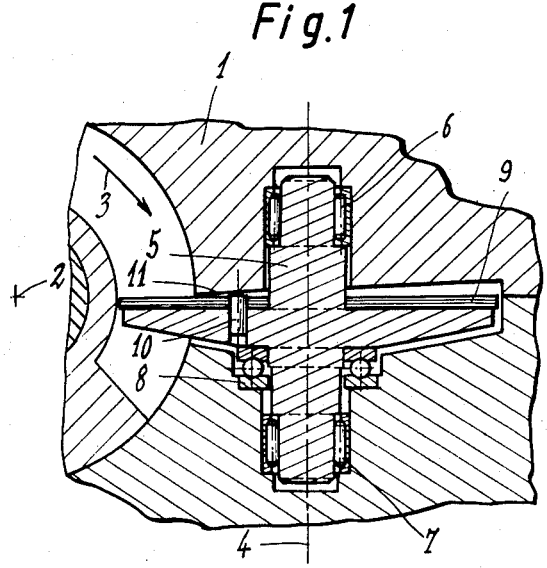
FIG. 1 is a diametral sectional view of a first embodiment of a pinion, covered with a plastic liner, according to the invention.
Figure 2:
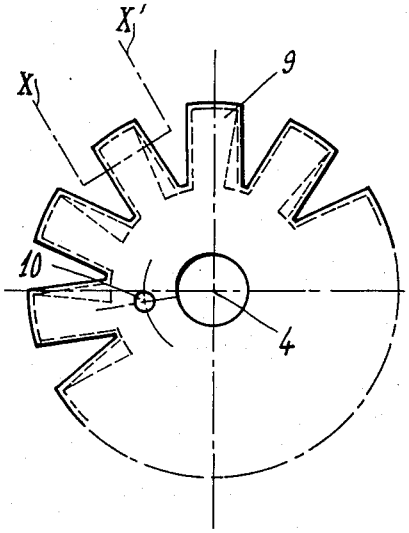
FIG. 2 is a plan view of the pinion of FIG. 1.

A first embodiment of a pinion according to the invention is shown in FIG. 1, in diametral sectional view, the teeth being arranged in a plane.

This pinion is part of a compressor comprising a casing 1, in which a multi-threaded rotor (not shown) is arranged to revolve around axis 2, in the direction of arrow 3. This pinion, arranged to revolve around axis 4, is formed of a metal part 5, preferably of steel or cast iron, supported in casing 1 by roller-bearings 6 and thrust-bearing 8.

That face of the pinion which is subjected to the fluid pressure is lined with a sheet of plastic material 9, attached to the pinion 5 with a metal plug 10 driven into the metal body of the pinion, and adjusted within a hole of the plastic liner with a clearance going from practically nil up to a few hundredths of one millimeter.

In the latter case, it will be noted that the plastic liner can not be lifted off its metal support, since it would then come against a flat face 11 of the casing, the corresponding gap in operation between liner 9, when resting on the pinion metal body 5, and the opposite face 11 of the casing being very thin, usually less than ten hundredths of one millimeter.

Therefore, parts 5 and 9 do not need any positive assembly means, such as nuts or alike.

Figure 3:
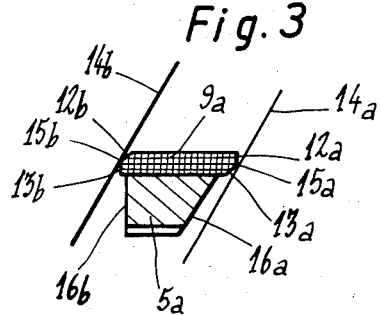
FIG. 3 is a sectional view of FIG. 2, along line X–X'.

FIG. 3 shows the arrangement of the plastic liner on its metal support, at the pinion teeth level.

Metal teeth such as 5a of pinion 5 are narrower than the distance between flanks 14a, 14b, of two adjoining threads of the rotor. Also, teeth such as 9a, formed in the plastic liner to cover metal teeth 5a, are wider than the latter, and the flanks of the plastic teeth have faces with different slopes 12a, 13a and 12b, 13b in order to adapt themselves, in a known manner, to angular changes in the threads of the rotor, when the pinion is rotating relatively to the latter. Intersections 15a, 15b between such slopes are corresponding to actual contact lines between flanks 12a, 12b of plastic teeth 9a and threads 14a, 14b.

Due to their narrower dimension, as compared with plastic teeth 9a, metal teeth 5a do not extend as far as the latter sideways, and their flanks 16a, 16b can not therefore get against thread faces 14a, 14b, even when plastic teeth are slightly shifted, relatively to their metal support.

It will be noted that metal teeth 5a are quite thicker than plastic teeth 9a, having to bear fluid pressure, under plastic teeth of only little stiffness.

The following dimensions can be indicated, for a typical embodiment of the kind just described. On a 170 millimeter diameter pinion, there are eleven teeth, each 35 mm long and 25 mm wide. In order to sustain loads corresponding to 7 bar compressed air, the metal support of the plastic teeth is 12 mm thick at the root of the teeth, and 6 mm thick at the tip, the plastic liner being 6 mm thick.

Slopes 13a, 13b of the plastic teeth extend over flanks 16a, 16b of the metal teeth by 0.5 millimeter, therefore allowing teeth 9a to shift around their average position by some 0.2 to 0.3 millimeter. Indeed, the invention provides such attachment means, for the resilient liner 9 on metal pinion 5, as to permit a slight shifting of the liner around its average position relatively to this pinion.

The aforementioned shift can be obtained just through the mere flexible properties of the plastic material. Using such plastics as polyamid 11, known under the trademark "Rilsan", or materials formed of alternate layers of cotton and asbestos fibers coated with phenolic resins and known under the trademarks "Celoron," "Synthane," or "Ferrobestos," a transverse shifting of the plastic teeth was observed relatively to their metallic support, reaching one tenth of a millimeter under sideways applied loads of a few kilogrammes.

This shifting possibility is distinctive with respect to such conventional structure, as described in U.S. Pat. No. 2,716,861 where a resilient material 17, such as rubber or polyamid 11 already mentioned, is applied in moulded form around metal teeth 18, completely surrounding them.

Practically, such a conventional structure was found unsatisfactory, since serious erosion effects would tend to develop after only a few hundred hours of operation, rapidly leading to a complete destruction of the machine. Moreover, machines built with such technology produce a serious noise of some 85 to 90 decibels at a distance of 1 meter, in the case of a compressor or a vacuum pump having a swept volume of 4,000 liters per minute, with two pinion teeth engaged on their both flanks, according to French Patent 1,331,998.

This invention, on the contrary, provides for machines having the advantage of being very quiet, in identical conditions with a noise level lower by some 15 decibels, besides a complete freedom of erosion. An additional advantage lies in the fact that, even if erosion is artificially started, say for instance with a high braking reaction applied on the pinion, the resulting wear will not tend to keep growing as formerly, once the artificial braking is interrupted. On the contrary, erosion effects will tend to remain unchanged in continued operation.

Without affecting at all the scope of the invention, these seriously improved results can be explained as follows.

Normally, when engaging the rotor, the pinion can be considered as a movable shutter, only subjected — in rotation — to such loads as derived from the friction in the bearings, which is negligible. The pinion therefore behaves as a completely loose gear, free to shake or vibrate around its average position between the threads of the rotor. Such vibrations involve angular accelerations, with resulting impact effects on both sides of each pinion tooth against the threads of the rotor. This approach of the problem is indeed sustained by the fact that typical wear scratches have been found with conventional pinions on both flanks of the rotor threads, and not only on that side which actually drives the pinion. The vibrations can be produced by small initial defects in the geometry of the machine.

Figure 4:
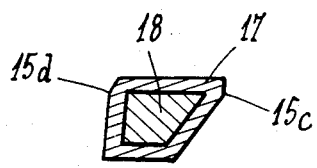
FIG. 4 is a sectional view, comparable to FIG. 3, of a conventional pinion tooth.

In the structure covered by the invention, such small defects are not suppressed. But, considering above-mentioned results, one would think that only the plastic liner of the pinion tends to vibrate around its average position, while its support, in other words the metal pinion, keeps turning smoothly at constant speed. Alone, the plastic liner has a very much lower inertia than the solid parts described in reference to FIG. 4; it is also more flexible. Finally, initial vibrations of the same amplitude will produce reduced impact effects where the kinetic energy is affected by the same ratio as between the respective properties of inertia and flexibility of the parts.

Whereas a resilient material is severely eroded by such impact effects, when it is solidly and completely attached to its metal support, no measurable erosion appears when this material is connected to its metal support with the flexible arrangement provided by the invention.

Figure 5:
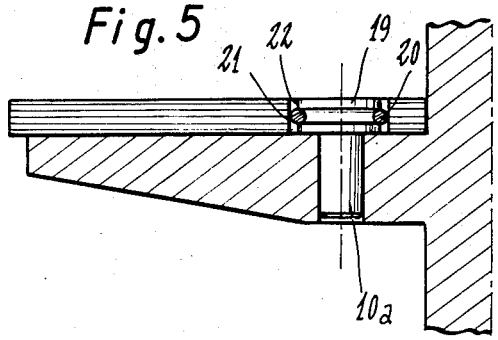
FIG. 5 is a sectional view of an alternative embodiment of the pinion shown in FIGS. 1 to 3.

Though this is not absolutely necessary for the above-indicated results, a more accurate control of the linear angular shifting around its average position and of the pull-back forces involved is obtained with an alternate arrangement of the attachment of the plastic liner on the metal pinion, as shown in FIG. 5.

In this alternate arrangement, there is a head 19 on plug 10a, with a round collar 22 where a ring 20 is inserted. Made for instance of rubber, ring 20 is applied against the wall of a bore 21, formed through plastic liner 9.

With this arrangement, pull-back forces acting on liner 9 can be adjusted with various values of the ring thickness, its initial compression being defined by diametral differences between bore 21 and the edge 22 of the plug head 19. Respective diameters of these two parts can be chosen with such values as to maintain the maximum possible angular shift of plastic teeth 9a, even after accidental destruction of ring 20, below the clearance provided by different widths of plastic teeth 13 and metal teeth 16 respectively, thus avoiding any possible contact of these meatal teeth against the rotor threads.

Figure 6:
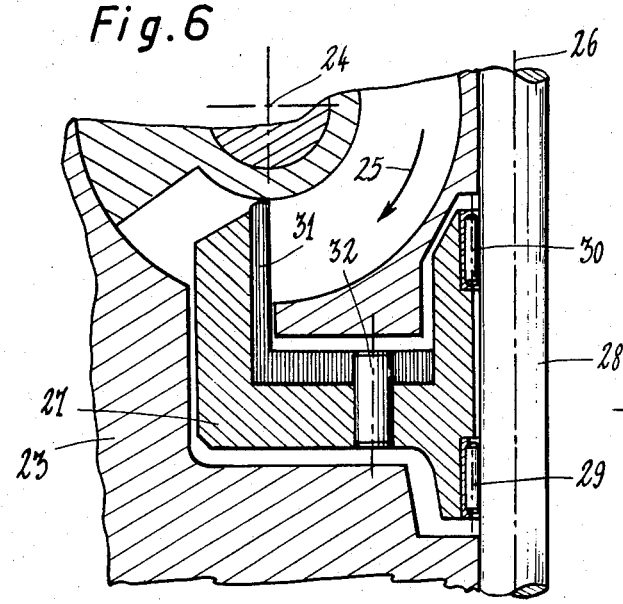
FIG. 6 is a sectional and diametral view of a second embodiment of a pinion, with its lining according to the invention.
Figure 7:
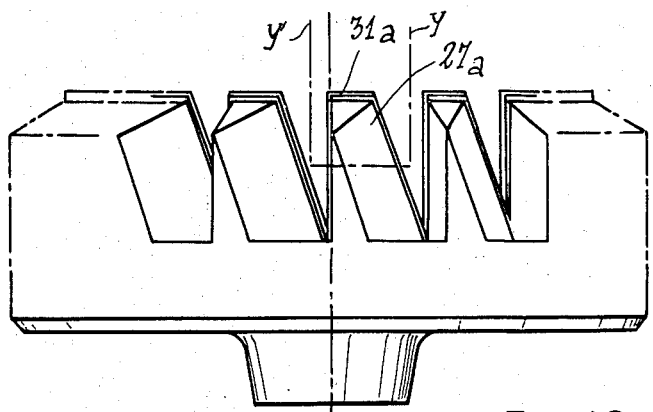
FIG. 7 is a partial perspective of the pinion of FIG. 6.
Figure 8:
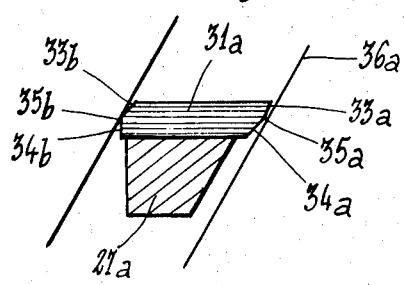
FIG. 8 is a sectional view along Y–Y' line of FIG. 7.

Another alternate embodiment of the invention is shown in FIGS. 6 to 8, corresponding to pinions with their teeth arranged on a cylindrical surface, according to French Patent No. 1,586,832.

In FIG. 6, a casing 23 is housing a threaded rotor (not shown) which is arranged to revolve around axis 24, in the direction indicated by arrow 25. A metal pinion 27, supported by needle-bearings 29, 30, in casing 23, is revolving around a shaft 28.

In this particular embodiment, fluid pressure is applied on the inside face of the cylindrical part of the toothed pinion 27, a plastic liner 31 being arranged within this hollow cylindrical pinion 27, with attachment plug 32.

FIG. 7 shows a metal tooth 27a covered by a plastic tooth 31a, their relative arrangement appearing in sectional view in FIG. 8. Flanks 36a, 36b of the rotor threads are bearing against bevel-edges 35a, 35b on each side of the plastic tooth, respectively at the intersection of slopes 33a, 34a and 33b, 34b.

As with other shapes of the pinion, high levels of erosion and noise have been observed, when the pinion is formed with a metal body completely surrounded with plastic material. But wear and noise are seriously reduced with a metal pinion having a flexibly attached liner, according to the invention.

This remarkable improvement is even more apparent in this particular arrangement, since a cylindrical pinion of the kind described has much more inertia than flat pinions which were previously described.

Naturally, in a compressor where the pinions would have their outside face, instead of the inner one, subjected to fluid pressure, the relative arrangement of the plastic liner over its metal pinion would be reversed, the liner then covering the outside face of the metal pinion instead of the inside.

The plastic liner 31 can be elastically attached to the metallic pinion, for instance by insertion of a resilient ring, as shown in FIG. 5 for the case of a plane pinion.

Figure 9:
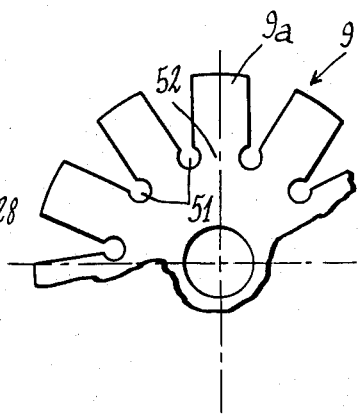
FIG. 9 is a partial plan view of another embodiment of the lining of the pinion shown in FIG. 2.
Figure 10:
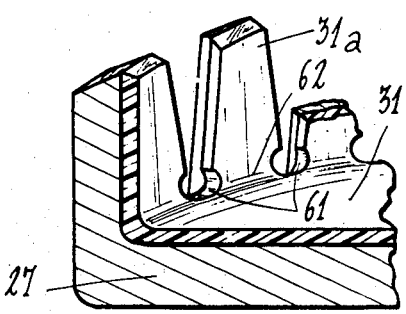
FIG. 10 is a partial perspective view of another embodiment of the pinion of FIG. 6 with its lining.

In cases when the shift between the liner and the metallic pinion is obtained through the flexibility of the plastic material of the liner, said flexibility can be increased by creating a region of reduced cross-sectional area close to the base of the teeth of the liner, as shown in FIG. 9 for a plane liner and FIG. 10 in the case of a liner for a pinion having its teeth on a cylindrical surface.

Teeth 9a or 31a are formed with notches 51, 61 which determine regions 52, 62 having a smaller cross-sectional area than that of the adjacent regions. Regions 52, 62 are located beyond the zone of the teeth which engages the flanks of the rotor thread and contribute to increase the shift of the teeth for a given lateral stress.

Such a feature is especially interesting for machines such as described in French Patents 1,331,998 and 1,586,832 wherein only one tooth engages the threads along all its height. The other teeth engage the threads only towards their end, where the shifting possiblity brought about by the notches is maximum.

Of course, the invention is not limited to such embodiments as just described, and various alternate arrangements can be introduced without departing from the scope of the invention.

What I claim is:

1. In a globoid or hourglass worm fluid flow machine, such as a compressor, pump or expansion unit, comprising a multi-threaded hourglass rotor, at least one toothed metal pinion whose teeth cooperate with said threads and have one face subjected to the fluid pressure, and a casing at least partially covering said rotor; the improvement in which the width of the teeth of the metal pinion is smaller than the distance between two contiguous threads of the rotor, a plastic material lining covering at least part of said face of the pinion which is subjected to the fluid pressure, the parts of this lining which cover the teeth of the pinion being wider than said teeth, in order to have said parts in touch with the threads of the rotor and to avoid contact of the teeth of the metal pinion with said threads, and means to allow a slight shift of said lining around its average position on the pinion.

2. A machine according to claim 1, wherein said means to allow a slight shift of said lining comprises means mounting said lining on said pinion for limited sliding movement on and relative to said teeth.

3. A machine according to claim 1, wherein that face of the teeth of the lining which is subjected to the fluid pressure is arranged in a plane.

4. A machine according to claim 1, wherein that face of the teeth of the lining which is subjected to the fluid pressure is formed in cylindrical arrangement.

5. A machine according to claim 1, wherein the plastic material lining is bound to the metal pinion with a flexible attachment.

6. A machine according to claim 5, wherein the metal pinion bears at least one protruding plug housed within a hollow part of the plastic liner, a resilient ring being arranged around the plug of the pinion, between the walls of the hollow part of the plastic liner and said plug.

7. A machine according to claim 1, wherein those parts of the liner which cover the pinion teeth have a region of reduced cross-sectional area, said region being located beyong those zones of said parts of the liner which engage the threads of the rotor.

* * * * *

UNITED STATES PATENT OFFICE
CERTIFICATE OF CORRECTION

Patent No. 3,788,784          Dated January 29, 1974

Inventor(s) Bernard Zimmern

It is certified that error appears in the above-identified patent and that said Letters Patent are hereby corrected as shown below:

On the Cover Sheet, in item [21], "268,890" should read -- 268,905 --.

Signed and sealed this 6th day of May 1975.

(SEAL)
Attest:

RUTH C. MASON
Attesting Officer

C. MARSHALL DANN
Commissioner of Patents
and Trademarks